(No Model.)
A. BECKERT.
BALANCE VALVE.
No. 325,649. Patented Sept. 8, 1885.
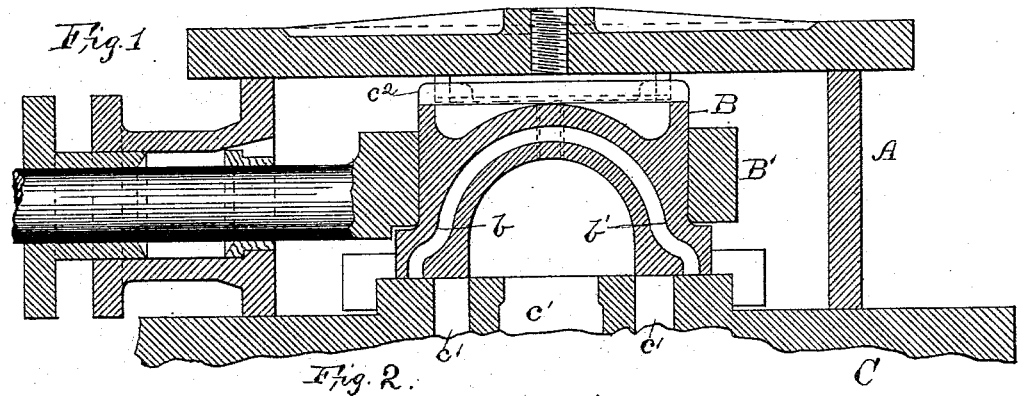
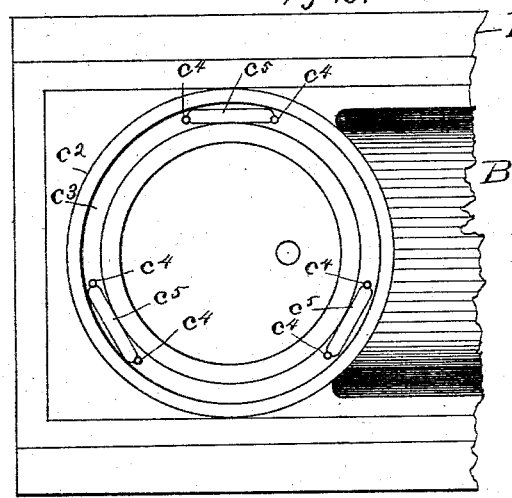
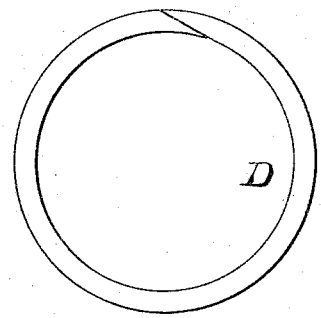
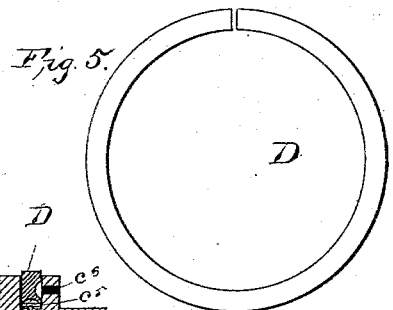
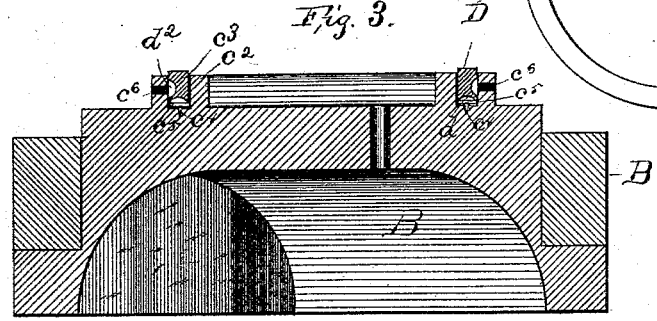
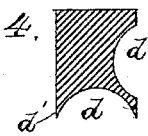

UNITED STATES PATENT OFFICE.

ANDREW BECKERT, OF BALTIMORE, MARYLAND.

BALANCE-VALVE.

SPECIFICATION forming part of Letters Patent No. 325,649, dated September 8, 1885.

Application filed June 26, 1885. (No model.)

*To all whom it may concern:*

Be it known that I, ANDREW BECKERT, a citizen of the United States, residing at Baltimore, State of Maryland, have invented certain new and useful Improvements in Balance-Valves; and I do hereby declare the following to be a full, clear, and exact description of the invention, such as will enable others skilled in the art to which it appertains to make and use the same.

My invention relates generally to balance-valves, and particularly to that class which is used upon locomotives. It its obvious, however, that it can be used upon stationary or any other kind of engine having a slide-valve. The object and nature of my invention will be fully described in the subjoined specification, and particularly pointed out in the claims, reference being had to the accompanying drawings, in which—

Figure 1 represents a section of a steam-chest, valve, and part of the cylinder, and showing the position of my improved device; Fig. 2, a top plan view of part of a valve, the part cut off being similar to that shown; Fig. 3, a section of the valve on an enlarged scale; Fig. 4, a section of the ring on an enlarged scale; Fig. 5, a plan of my preferred form of ring, and Fig. 6 a modified form of ring.

A represents the steam-chest; B, the valve, having the yoke B', stem B², and the usual supply and exhaust passages, $b$ and $b'$; and C a part of the cylinder, having the ports $c$ and $c'$. As all of these parts are old, an extended description of them is unnecessary. Upon the upper side of the valve is formed a collar, $c^2$, having an annular recess, $c^3$, at the bottom of which are studs $c^4$ for retaining elliptical springs $c^5$ in place, and the openings $c^6$, which admit steam in the recess $c^3$.

D is a ring which rests upon the springs $c^5$ in recess $c^3$. The bottom of the ring is grooved at $d$. The inner wall, $d'$, of this groove is preferably flexible or springy, so that the pressure of the steam in this groove will force the wall $d'$ tightly against the inner wall of the recess $c^3$. Upon the outer face of the ring is a groove, $d^2$, which comes opposite to the openings $c^6$, so that the steam will have free access to or action upon the ring as soon as admitted to the chest.

The ring D may be split diametrically or tangentially, as shown in Figs. 5 and 6, so that the pressure of the steam will reduce its circumference.

In practice the ring is placed in the recess $c^3$ and is loosely held against the top of the chest by the elliptical springs. When steam is turned into the chest, its pressure forces the split ring upwardly against the top of the chest and against the inner wall of the recess $c^3$. The wall $d'$ of groove $d$, being more or less flexible, is forced by the pressure of the steam against the inner wall of the recess $c^3$, so that no steam can pass between the ring and collar. The pressure of the steam upon the vertical outer face of the ring effectually closes the split against the passage of steam.

What I claim as new is—

1. In a balance-valve, a ring having in its bottom a recess provided with a flexible inner wall, substantially as described.

2. In a balance-valve, a split ring having in its bottom a recess provided with a flexible inner wall, substantially as described.

3. In a balance-valve, a tangential split ring having in its bottom a recess provided with a flexible inner wall, substantially as described.

In testimony whereof I affix my signature in presence of two witnesses.

ANDREW BECKERT.

Witnesses:
HENRY TAYLOR,
MURRAY HANSON.